(12) United States Patent
Castagna et al.

(10) Patent No.: US 8,262,297 B2
(45) Date of Patent: Sep. 11, 2012

(54) BODY HAVING A DEDICATED LENS FOR IMAGING AN ALIGNMENT FEATURE

(75) Inventors: Lou Castagna, Middletown, PA (US); Richard Dean Miller, Lancaster, PA (US); Daniel Gillis, Harrisburg, PA (US); Donald Eugene Dellinger, Hellam, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 223 days.

(21) Appl. No.: 12/847,353

(22) Filed: Jul. 30, 2010

(65) Prior Publication Data

US 2012/0027345 A1   Feb. 2, 2012

(51) Int. Cl.
*G02B 6/42* (2006.01)
(52) U.S. Cl. ............................ 385/90; 385/52
(58) Field of Classification Search .............. 385/52, 385/90
See application file for complete search history.

(56) References Cited

U.S. PATENT DOCUMENTS

| 4,904,036 | A | 2/1990 | Blonder |
| 5,073,003 | A | 12/1991 | Clark |
| 5,515,468 | A | 5/1996 | DeAndrea et al. |
| 5,708,743 | A | 1/1998 | DeAndrea et al. |
| 6,748,145 | B2 * | 6/2004 | Border et al. .................. 385/52 |
| 7,399,125 | B1 | 7/2008 | Whaley et al. |
| 2004/0234210 | A1 | 11/2004 | Nagasaka et al. |
| 2006/0045410 | A1 | 3/2006 | Trott et al. |

FOREIGN PATENT DOCUMENTS

| EP | 1 321 784 A2 | 6/2003 |
| EP | 1 972 975 A1 | 9/2008 |

OTHER PUBLICATIONS

International Search Report, International Application No. PCT/US2011/001317, International Filing Date Jul. 26, 2011.

* cited by examiner

*Primary Examiner* — Jerry Rahll (57) ABSTRACT

A body is configured for alignment to a substrate having an alignment feature. The body includes an alignment structure defining a viewing surface, and a dedicated lens adapted to focus an image of the substrate's alignment feature through an optically-clear material of the body and onto the viewing surface. In the fiber optic context, a lens body is provided for optically coupling a substrate's OED to a corresponding optical fiber. The lens body further includes at least one active lens adapted to cooperate optically with a respective OED. The dedicated lens is positioned externally to any optical path. An optical subassembly includes a substrate having at least one perceptible alignment feature provided in a predetermined spatial relationship to the OED, and a lens body secured to the substrate such that the image of the substrate's alignment feature appears aligned relative to the viewing surface.

19 Claims, 7 Drawing Sheets

BODY HAVING A DEDICATED LENS FOR IMAGING AN ALIGNMENT FEATURE

FIELD OF INVENTION

The present invention relates generally to alignment of articles into an operative position, such as alignment of coupling devices for optically coupling a fiber optic cable and an opto-electronic device, and more particularly to a lens body having at least one dedicated lens for focusing an image of a substrate alignment feature onto an alignment structure on the lens body, for the purpose of properly aligning the lens body with opto-electronic devices on the substrate.

BACKGROUND

Typical fiber optic connectors require a coupling device which effectively optically couples the fiber optic transmission line with an opto-electronic device (OED). The OED is further electronically coupled to electronic circuits which operate in conjunction with the OED. Often, such electronic circuits, including integrated circuits, are mounted on a printed circuit board or ceramic substrate. To accommodate the use of optical transmission devices in densely packed parallel arrangements of circuit boards, it is commonly required that the fiber optic cable enter the printed circuit board along a path substantially parallel to the board with which it will interface.

A prevalent technology in the optical communications industry is surface emitting and detecting devices. Devices such as vertical cavity surface emitting lasers (VCSELs), surface emitting light emitting diodes as well as most PIN detectors have a photosensitive surface to receive or emit light from or to the top or bottom surface. These devices have certain benefits, and alignment of devices such as these to optical fibers has proved relatively difficult, requiring relatively complicated optical structures and paths to effect the coupling.

Some success has been met in coupling surface emitting and detecting devices through a 90 degree molded optic coupler as is disclosed in U.S. Pat. Nos. 5,515,468 and 5,708,743 to DeAndrea, et al., the entire disclosures of both of which are hereby incorporated herein by reference. This technology makes use of polymer molded integrated light coupling devices suitable for coupling light from an OED to an optical fiber and vice versa, and require the device to be disposed on a different plane than the fiber with the light being communicated there between by a reflective surface. Further examples of such techniques are found in U.S. Pat. Nos. 5,073,003 and 4,904,036 to Clark and Blonder respectively, the disclosures of both of which are hereby incorporated herein by reference.

A certain exemplary transceiver lens body 10 (see FIGS. 1a-1f) is generally consistent with these light-bending techniques and includes a body 12 having a fiber-receiving port 14 abutting an interface surface 16 in a side of the body, a reflective surface 20 for redirecting light traveling along an optical path A substantially perpendicularly to the optical fibers disposed in the port 14, and an array 22 of lenses 24 positioned along the bottom 26 of the body 12 to focus light travelling substantially perpendicularly to the fibers in the port 14 through the reflective surface 20 and between the lenses 24 and the interface surface 16, e.g., into fibers supported in the port and abutting the interface surface 16. Thus, the lens body 10 provides optical paths adapted for optically coupling an OED supported on a substrate with a corresponding fiber supported in the port 14 of the lens body 10. As will be appreciated by those of ordinary skill in the art, such a lens body 10 is suitable for inclusion in various cable assemblies and transceivers, which may be mounted in a variety of host systems including for example, routers, computers, switches, bridges, and I/O cards.

Accordingly, it will be appreciated that alignment of the lens body to the substrate, or more particularly, alignment of the lenses, optical paths and fibers to the OEDs on the substrate, is critical for proper optical coupling between the OEDs and the fibers. Active alignment techniques are sometimes used to align the lens body relative to a substrate supporting OEDs (such as VCSELs or other light sources) emitting or receiving light substantially perpendicularly to a plane of the substrate. In an active alignment technique, the light sources are activated (emitting). A problem with active alignment techniques is that the process requires special imaging equipment and can be expensive, particularly with respect to light bending optical couplings. Various passive alignment techniques may also be used. In one passive alignment technique, an image of the light source itself (e.g., a portion of a VCSEL) may be viewed with the human eye through the reflective surface and lenses, thus eliminating the need for special imaging equipment. However, this method requires additional hardware and fixturing to properly view the alignment features, due to tight spacing constraints in the OED assembly. Additionally, this technique is unsafe in that any accidental activation of the light sources will cause damage to the human eye used during the alignment process, since the optical paths for alignment and communication purposes are identical or parallel and/or the alignment feature is the light source itself (e.g., a VCSEL) and thus the eye is in position to be damaged during visualization for alignment purposes. In yet another passive alignment technique, alignment features are provided on the substrate in the same place as the VCSELs/PINs/OEDs. However, in such an arrangement, the alignment structures of the lens body are in a different plane, parallel to and removed from the plane of the VCSELs/PINs OED's. These alignment features are then viewed through a path external to the reflective surface to eliminate the tight spacing constraints. Though safer in that damage to the human eye is less likely in the event of accidental activation of a light source, this method is unsatisfactory and produces inaccurate results because the difference in depths of field, between the two planes, exceed the capability of typical imaging systems. Therefore, in order to achieve alignment, a fixed external reference point must be introduced to which alignment features must be aligned individually. The end result is that the alignment features and alignment structures would be aligned to each other, but the additional step of having to align each to an external reference point introduces additional inaccuracies.

Therefore, Applicants have identified a need for a lens body for coupling an optical fiber to an OED that allows for safe viewing and accurate alignment of any light sources, without the need for special hardware and/or fixturing, using a passive alignment technique. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A lens body in accordance with one aspect of the present invention includes a body of an optically-clear moldable material. The body includes a port for receiving a ferrule supporting at least one optical fiber. The port includes a contact surface positioned to abut and interface with the optical fiber when the ferrule is positioned in the port. The body further includes at least one active lens adapted to cooperate optically with a respective OED to focus light along a respective optical path between the OED and a corresponding optical fiber. The lens body also includes at least one alignment structure defining a viewing surface, and at least one dedicated lens adapted to focus an image of an alignment feature on the substrate onto the viewing surface. The dedicated lens is positioned externally to any optical path between a light source and corresponding optical fiber.

Another aspect of the present invention provides an optical subassembly including a substrate supporting an OED/light source having an optical axis, the substrate further comprising at least one perceptible alignment feature provided in a predetermined spatial relationship to the OED/light source, and a lens body secured to the substrate.

The substrate's alignment feature(s) is/are provided in a predetermined spatial relationship relative to the OEDs on the substrate. This predetermined spatial relationship corresponds to a spatial relationship between the viewing surfaces and the dedicated lenses of the lens body. In this manner, alignment of the substrate's alignment features with the lens body's viewing surfaces ensures proper alignment of the substrate's OEDs with the lens body's active lenses, light paths, and any connected fibers.

Optionally, the lens body includes multiple active lenses and/or multiple dedicated lenses and multiple alignment features. Further, the lens body may also include at least one reflective surface disposed along one or more optical paths to alter the direction of the optical paths between each OED and its corresponding optical fiber.

Another aspect of the present invention provides a method for preparing an optical subassembly. The method includes providing a substrate supporting a light source having optical axis, the substrate further comprising at least one alignment feature provided in a predetermined spatial relationship to the light source, providing a lens body having an alignment structure having a viewing surface, positioning the lens body on the substrate so that the substrate's alignment feature is viewable on the lens body's viewing surface, moving the lens body relative to the substrate until the image of the substrate's alignment feature appears aligned relative to the viewing surface, and securing the body to the substrate. In this manner, an optical subassembly is provided in which the substrate's OEDs are properly aligned with the lens body's active lenses, light paths, and any connected fibers.

Yet another aspect of the present invention involves alignment of articles more generally, including articles unrelated to fiber optic communications. In accordance with this aspect, the present invention provides a body configured for alignment to a substrate comprising at least one perceptible alignment feature. The body includes at least one alignment structure defining a viewing surface; and a dedicated lens adapted to focus an image of the substrate's alignment feature through an optically-clear material of the body and onto the viewing surface. An assembly may includes the body and the substrate comprising at least one perceptible alignment feature, such that the body is secured to the substrate with the substrate's alignment feature aligned relative to, e.g., centered within a boundary of, the viewing surface of the body's alignment structure.

BRIEF SUMMARY OF DRAWINGS

The present invention will now be described by way of example with reference to the following drawings in which:

FIG. 1e is a cross-sectional view of the lens body of FIGS. 1a-1d, taken along line A-A' of FIG. 1a;

FIG. 2e is a cross-sectional view of the lens body of FIGS. 2a-2d, taken along line B-B' of FIG. 2a;

DETAILED DESCRIPTION

For illustrative purposes, the present invention is discussed below in the context of a lens body. As discussed above, FIGS. 1a-1f show an exemplary lens body 10 that has features in common with prior art lens bodies. The illustrated lens body 10 includes a body 12 that is exemplary of many prior art lens bodies in that it includes a bottom surface 26 for abutting a substrate supporting one or more OEDs (such as VCSELs), a port 14 for receiving one or more optical fibers for carrying light to or from the OEDs, a lens 24 corresponding to each OED for focusing light from the OEDs onto an interface surface 16 of the port 14 and into optical fibers abutting the interface surface 16 (or vice versa), and a reflective surface 20 for reflecting light transmitted between the OEDs and the optical fibers abutting the interface surface 16. As used here, "abutting" or "interfacing" means physically contacting in abutting relationship or nearly in physical contact, e.g., separated by a gap of nor more than approximately 0.025 mm. Thus, the lens body 10 provides an optical path between each OED on the substrate and each optical fiber supported in the port 14, and thus is suitable for optically coupling the OED(s) and the optical fiber(s).

Figure 1A:
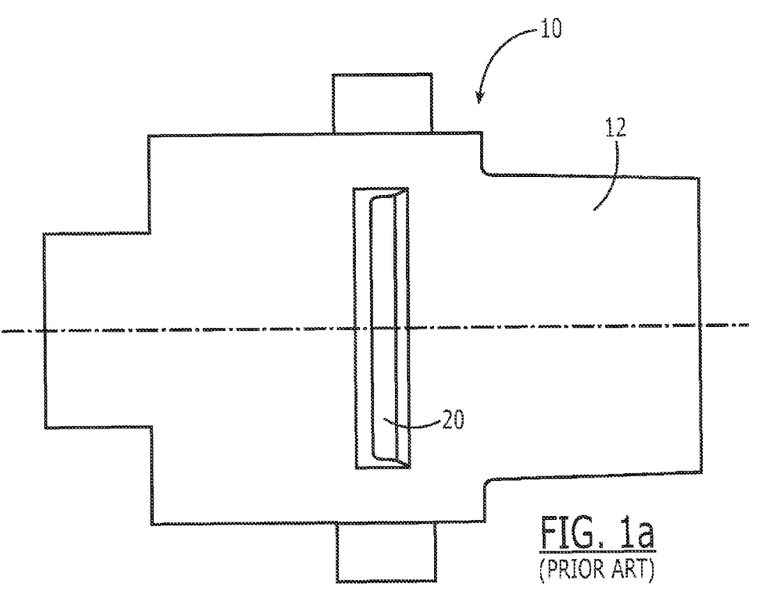
FIGS. 1a, 1b, 1c and 1d are top, side, bottom and rear views, respectively, of an exemplary prior art lens body including lenses and a reflective surface for bending light travelling between OEDs mounted on a substrate and optical fibers substantially parallel to a plane of the substrate.
Figure 1B:
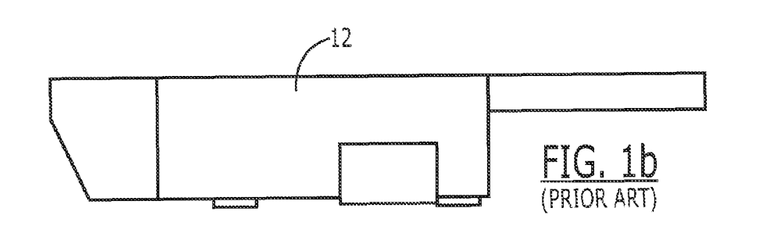
Figure 1C:
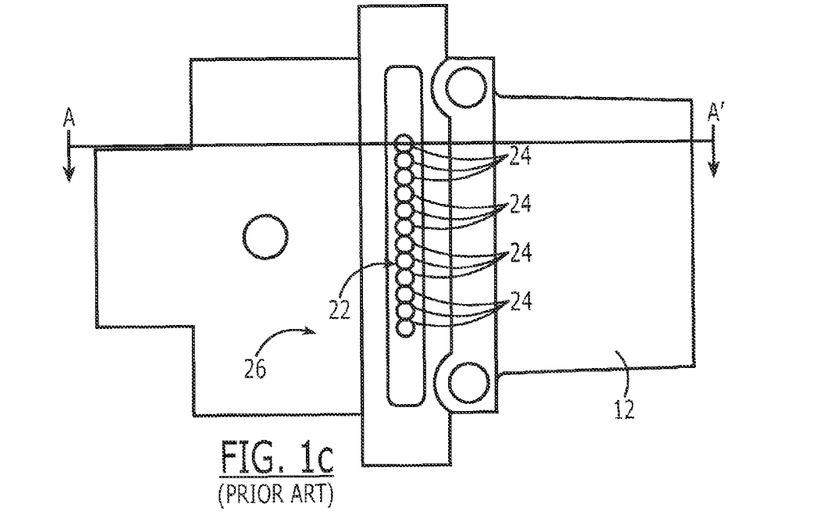
Figure 1D:
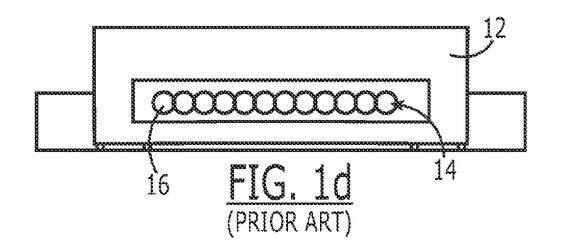
Figure 1E:
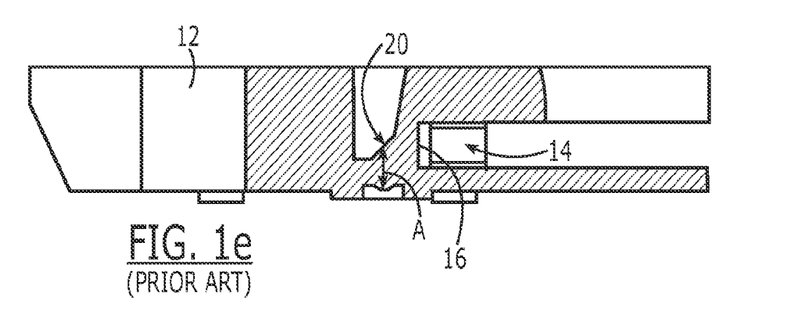
Figure 1F:
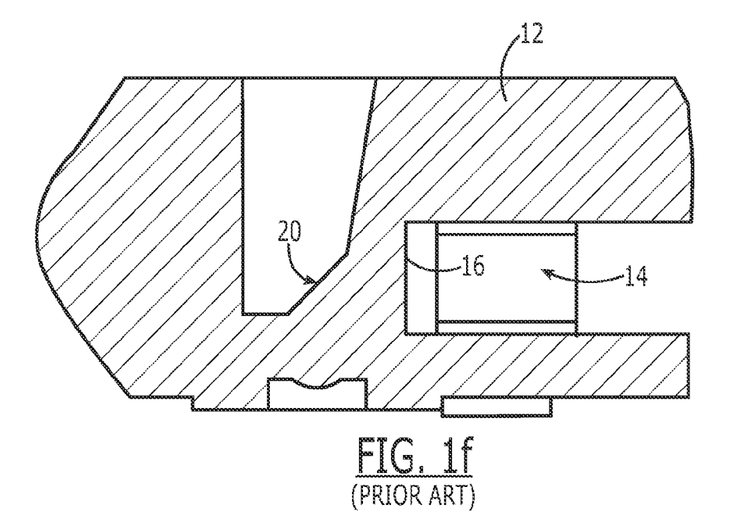
FIG. 1f is a partial cross-sectional view of the lens body of FIGS. 1a-1d, showing an enlarged view of Region 1 of FIG. 1e.
Figure 2A:
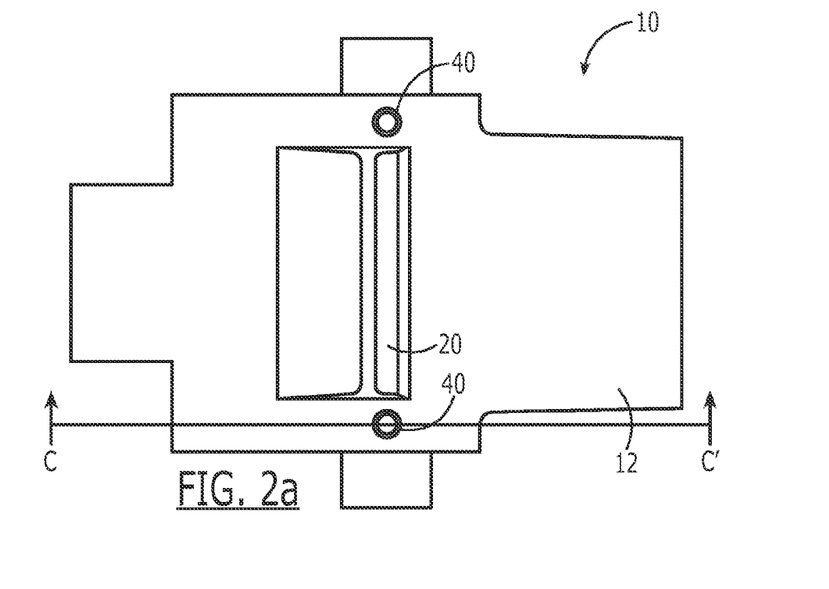
FIGS. 2a, 2b, 2c and 2d are top, side, bottom and rear views, respectively, of an exemplary lens body including alignment structures and dedicated alignment lenses in accordance with the present invention.
Figure 2B:
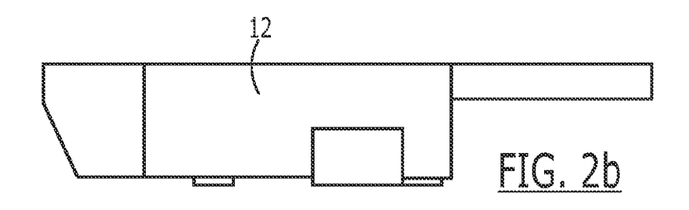
Figure 2C:
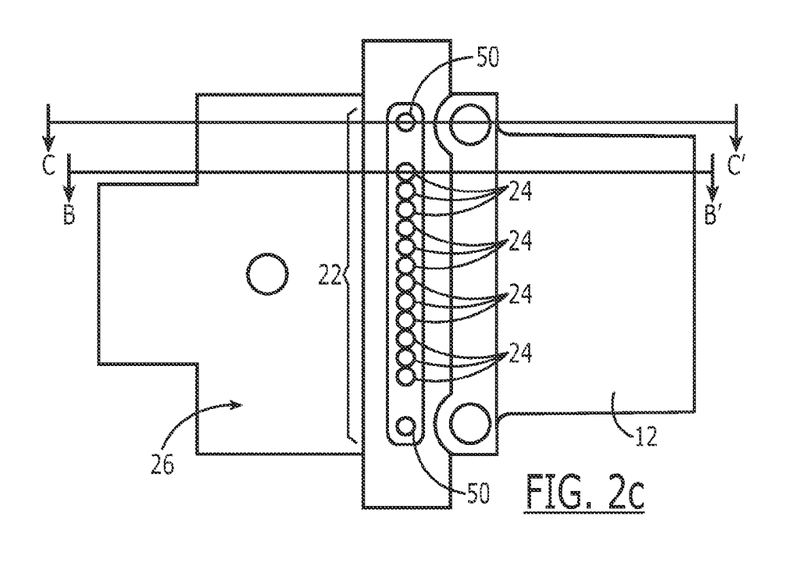
Figure 2D:
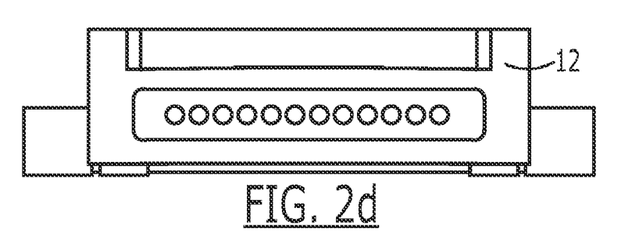
Figure 2E:
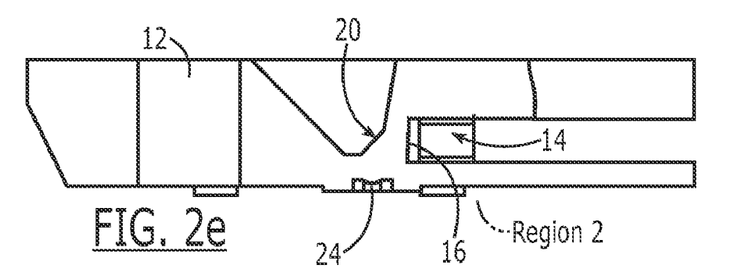
Figure 2F:
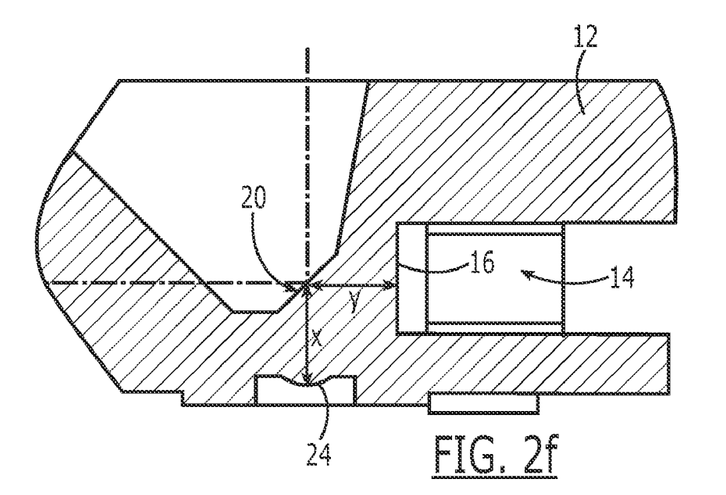
FIG. 2f is a partial cross-sectional view of the lens body of FIGS. 2a-2d showing an enlarged view of Region 2 of FIG. 2e.

FIGS. 2a-2g show an exemplary lens body 10 in accordance with the present invention. The lens body may be similar to prior art lens bodies with respect to its overall structure, and thus may include active lenses 24 corresponding to each OED, a fiber-receiving port having an interface surface 16, and a reflective surface intermediate the optical paths between the active lenses and the port/coupled fibers, etc. Optionally, the reflective surface may be provided as part of a total internal reflection (TIR) prism, as known in the art. Preferably, the lens body 10 includes a plurality of active lenses 24 (twelve shown) arranged in a linear array, as shown in FIGS. 2c and 2d. See FIGS. 2a-2g. Accordingly, the exemplary lens body 10 of FIGS. 2a-2g includes structures similar to those discussed above with reference to the exemplary prior art lens body of FIGS. 1a-1f. Further, the lens body 10 of FIGS. 2a-2g preferably comprises a unitary body structure of an optically-clear moldable material. The term "optically-clear moldable material" as used herein means characterized by low losses in the transmission of an optical signal. For example, the lens body may be uniformly formed by molding fluent plastic material into a precisely-defined shape and configuration such that all of the optical path elements are set, e.g. by injection molding, compression molding or transfer molding a polycarbonate, polyether-imide or polyarylsulfone material, such as those commercially available General Electric as ULTEM™ or RADEL™. The port 14 may be configured to accept any conventional device suitable for cooperating with one or more fibers presented in a cable ferrule/assembly. As the term is used herein, "opto-electronic device" or OED refers to a device that converts electrical current to light and/or light to electrical current. The term "light" refers generally to electromagnetic radiation, and preferably to those wavelengths of electromagnetic radiation to which semi-conductive material is, or can be made, sensitive, whether or not such light is actually visible to the unaided eye. Examples of OEDs include lasers (e.g., vertical cavity surface emitting laser (VCSEL), double channel, planar buried heterostructure (DC-PBH), buried crescent (BC), distributed feedback (DFB), distributed bragg reflector (DBR), etc.), light emitting diodes (LEDs) (e.g. surface emitting LED (SLED), edge emitting LED (ELED), super luminescent diode (SLD), etc.) and photodiodes (e.g., P Intrinsic N (PIN), avalanche photodiode (APD), etc.) By way of further example, an OED, as used herein, may be a light sources such as an optical fibers, such as a multi-mode (mm) or single-mode (sm) fibers, glass fibers, plastic fibers, etc. The OEDs are mounted to the surface of a substrate. As the term is used herein, "substrate" may refer to virtually any component or article. However, in the context of fiber optic communications, the term "substrate" as used herein refers to an electronic component having electronic circuit elements mounted thereto or forming part thereof. The substrate may include, for example, a plurality of integrated chips. Such chips may represent, for example, a pre-amplifier or post-amplifier and additional electronic circuits. The type and nature of such circuit elements, and the techniques and methods for mounting such elements to the substrate are well known in the art and do not form part of the present invention. In typical embodiments, the substrate comprises a printed circuit board (PCB), a printed wiring board (PWB), a flexible printed circuit (FPC), a circuitry-bearing glass wafer, and/or similar substrates well known in the art.

Unlike prior art lens bodies, a lens body 10 in accordance with the present invention further includes at least one alignment structure 40 defining a viewing surface 42 (see FIGS. 2a, 2g), and at least one dedicated lens 50 (see FIGS. 2c, 2g) positioned externally to any optical path that passes through the lens body 10 between optical components. Preferably, the lens body includes at least a pair of dedicated lenses 50. Optionally, the pair of dedicated lenses 50 are arranged in the same single linear array along with the active lenses 24, as best shown in FIG. 2c. In such an embodiment, all of plurality of active lenses 24 may be positioned between the pair of dedicated lenses 50 within the linear array, as shown in FIG. 2c. Such positioning of the dedicated lenses relative to the active lenses can facilitate proper alignment.

Figure 2G:
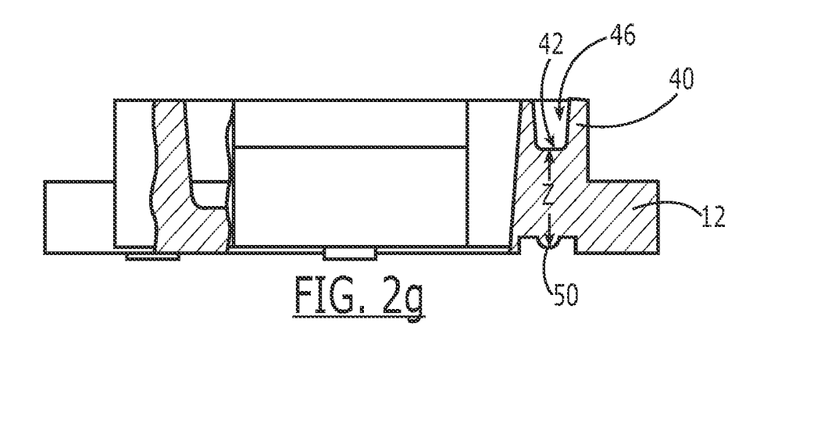
FIG. 2g is a cross-sectional view of the lens body of FIGS. 2a-2d, taken along line C-C' of FIGS. 2a and 2c.
Figure 4:
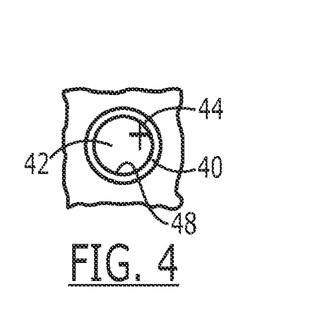
FIG. 4 is a partial top view of the lens body of FIGS. 2a-2g, showing a plan view of an exemplary substrate alignment feature as viewed in misalignment with an alignment structure of the lens body.

In a preferred embodiment, the alignment structure 40 defines a void 46 in the body 12 adjacent a substantially-planar viewing surface 42, as best shown in FIG. 2g. By way of example, the void may be formed by a core pin during injection molding of the body to provide a highly polished viewing surface 42 to facilitate viewing of an image projected thereon. In the exemplary embodiment shown in FIGS. 2a-2g, the alignment structure 40 is formed so that the void 46 has an inverted truncated conical shape. Though any suitable structure may be used, this shape has advantages with respect to molding of the body 12, and has further advantages in that it provides a viewing surface 42 that has a circular peripheral boundary 48, as best shown in FIG. 4. Such a boundary may be advantageous to a human when discerning when the image 44 of the alignment structure 74 is centered/aligned with the viewing surface 42, as discussed below. However, any suitable shape and configuration for the alignment structure and/or the viewing surface/boundary may be used.

Further, the substrate 70 is specially-configured in accordance with the present invention to include at least one perceptible alignment feature 74. By way of example, the substrate's alignment feature may be configured to appear as a circle, a plus sign, an X, or any other perceptible image printed or otherwise provided on the surface of the substrate 70. By way of example, the alignment feature may be provided on the substrate 70 as a thin film of metal provided by a precision chemical etching process. It is preferred that the alignment feature 74 be substantially flat, and lie in substantially the same plane as a light-emitting surface of the light source. This allows the dedicated alignment lens(es) to be of identical shape to the active lens(es), and to be made using the same tool/process, thereby eliminating mold fabrication tooling change-over which can introduce error in the location of the dedicated lens(es) relative to the active lens(es). In one embodiment, a single alignment feature of this type is provided, which may cooperate with another form of alignment feature, e.g., a mechanical pin-and-socket arrangement. In a preferred embodiment, at least a pair of such alignment features are provided on the substrate.

The substrate's alignment feature(s) is/are provided in a predetermined spatial relationship relative to the OEDs on the substrate 70. This predetermined spatial relationship corresponds to a spatial relationship between the viewing surfaces 42 and the dedicated lenses 50 of the lens body 10. In this manner, alignment of the substrate's alignment features 74 with the lens body's viewing surfaces 42 will ensure proper alignment of the OEDs 80 with the lens body's active lenses 24, light paths, and any connected fibers. Each dedicated lens 50 is adapted to focus an image 44 (see FIGS. 4 and 5) of the substrate's alignment feature 74 (see FIG. 3) onto a viewing surface 42 for the purpose of properly aligning the lens body 10 with the substrate 70 (see FIG. 3), or more particularly, alignment of the active lenses 24, light paths and fibers to the OEDs 80 on the substrate 70, for proper optical coupling between the OEDs and the fibers.

In a preferred embodiment, the active lenses 24 and the dedicated lenses 50 are configured to have substantially identical optical prescriptions, such that they having a substantially identical focal length. In such an embodiment, each viewing surface 42 is positioned on the lens body 10 such that the optical path length between the active lens 24 and the interface surface 16 (X+Y, FIG. 2f) is substantially identical to the optical path length (Z, FIG. 2g) between the dedicated lens 50 and the viewing surface 24. In this embodiment, both the viewing surface 24 and the image 44 of the substrate's alignment feature 74 lie in the same (or very nearly the same) plane, and thus are both easily and clearly perceivable by the human eye or conventional imaging systems as both will appear clearly with the same depth of field from a point of observation. This eliminates the need to focus on and align different alignment features lying in different planes at different depths of field, and facilitates accurate alignment, even with nothing more than the human eye.

In an alternative embodiment, the dedicated lens has a prescription/focal length different from that of an active lens. In such an embodiment, the optical path length between the active lens and the interface surface would preferably not be substantially identical to the optical path length between the dedicated lens and the viewing surface. Instead, the path length between the dedicated lens and the viewing surface is substantially identical to the focal length of the dedicated lens.

In a preferred embodiment of the lens body 10, such as that shown in FIGS. 2a-2g, the lens body 10 further includes at least one reflective surface 20 disposed along one or more optical paths, between the OED 80/active lens 24 and the interface surface 16/fibers, to alter the direction of the optical paths between each OED and its corresponding optical fiber. An optical path between each of the dedicated lenses 50 and each respective viewing surface 42 is preferably linear. Thus, in such an embodiment, the optical path between the viewing surface 42 and the dedicated lens 50 does not pass through the reflective surface 20. Further, the optical path between the viewing surface 42 and the dedicated lens 50 is preferably parallel to an optical path between the active lens 24 and the reflective surface 20 and/or perpendicular to an optical path between the reflective surface 20 and the interface surface 16 and/or the optical axis of any fibers positioned in a ferrule in the port 14.

The lens body 10 of FIGS. 2a-2g may be used to prepare an optical subassembly including the lens body. A method of preparing such an optical subassembly includes providing a substrate 70 (FIG. 3) supporting an OED 80, such as a light source. Such a substrate may be substantially conventional in nature, such as a thin glass wafer with conductive circuitry, and thus techniques for providing same are not discussed here in further detail. However, this step further includes providing a substrate that includes at least one perceptible alignment feature 74 (FIG. 3) provided in a predetermined spatial relationship to the light source. Preferably, substrate comprises at least a pair of alignment features, and each of the alignment features is visually perceptible with the unaided human eye. Techniques for providing an alignment feature, such as a circle, + or X include a precision chemical etching process. Alternatively, the alignment feature is perceptible, but not visually perceptible with the unaided eye. For example, such an alignment feature may include an infrared target, such as a suitable VCSEL or other light source, and suitable imaging equipment is used to perceive the alignment feature for alignment purposes.

Figure 5:
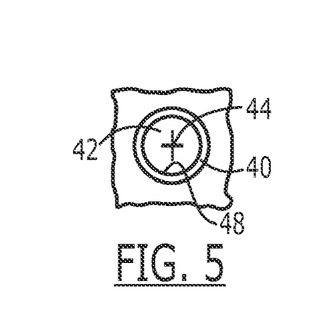
FIG. 5 is a partial top view of the lens body of FIGS. 2a-2g, showing a plan view of an exemplary substrate alignment feature as viewed in alignment with an alignment structure of the lens body.

The method further includes providing the lens body 10, and positioning the body 12 on the substrate 70 so that the substrate's alignment feature 74 is viewable on the viewing surface 42 of the lens body's alignment structure 40, as best shown in FIG. 4. The method further includes moving the body 12 relative to the substrate 70 until the image 44 of the substrate's alignment feature 74 appears aligned, e.g., centered, relative to the viewing surface 42 and/or its peripheral boundary 44, as best shown in FIG. 5. For lens bodies including more than one alignment feature and more than one alignment structure, the lens body should be moved until all images 44 concurrently appear to be aligned relative to a respective viewing surface. The lens body 12 should then be secured relative to the substrate. This step may involve applying and curing a suitable epoxy, such as a UV-curable epoxy, as well known in the art.

Figure 3:
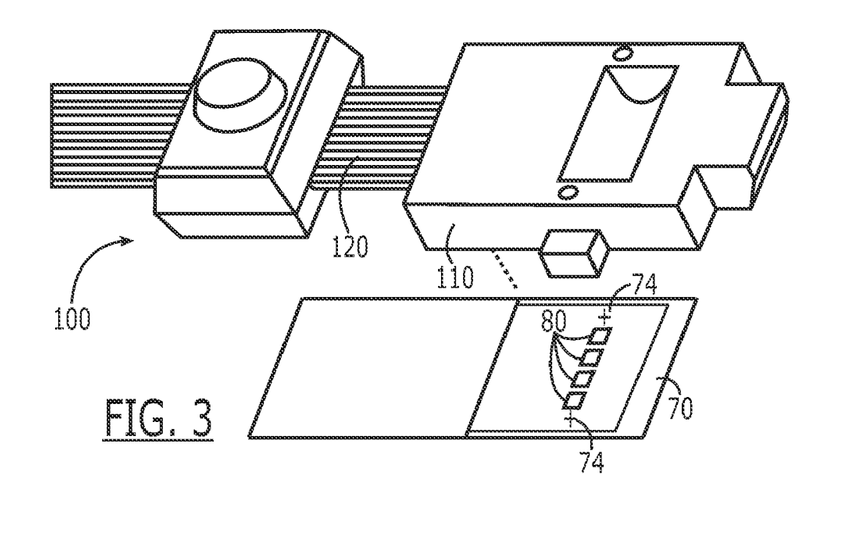
FIG. 3 is a perspective view of the lens body of FIGS. 2a-2g, shown in an exploded view relative to an exemplary ferrule and substrate.
Figure 6:
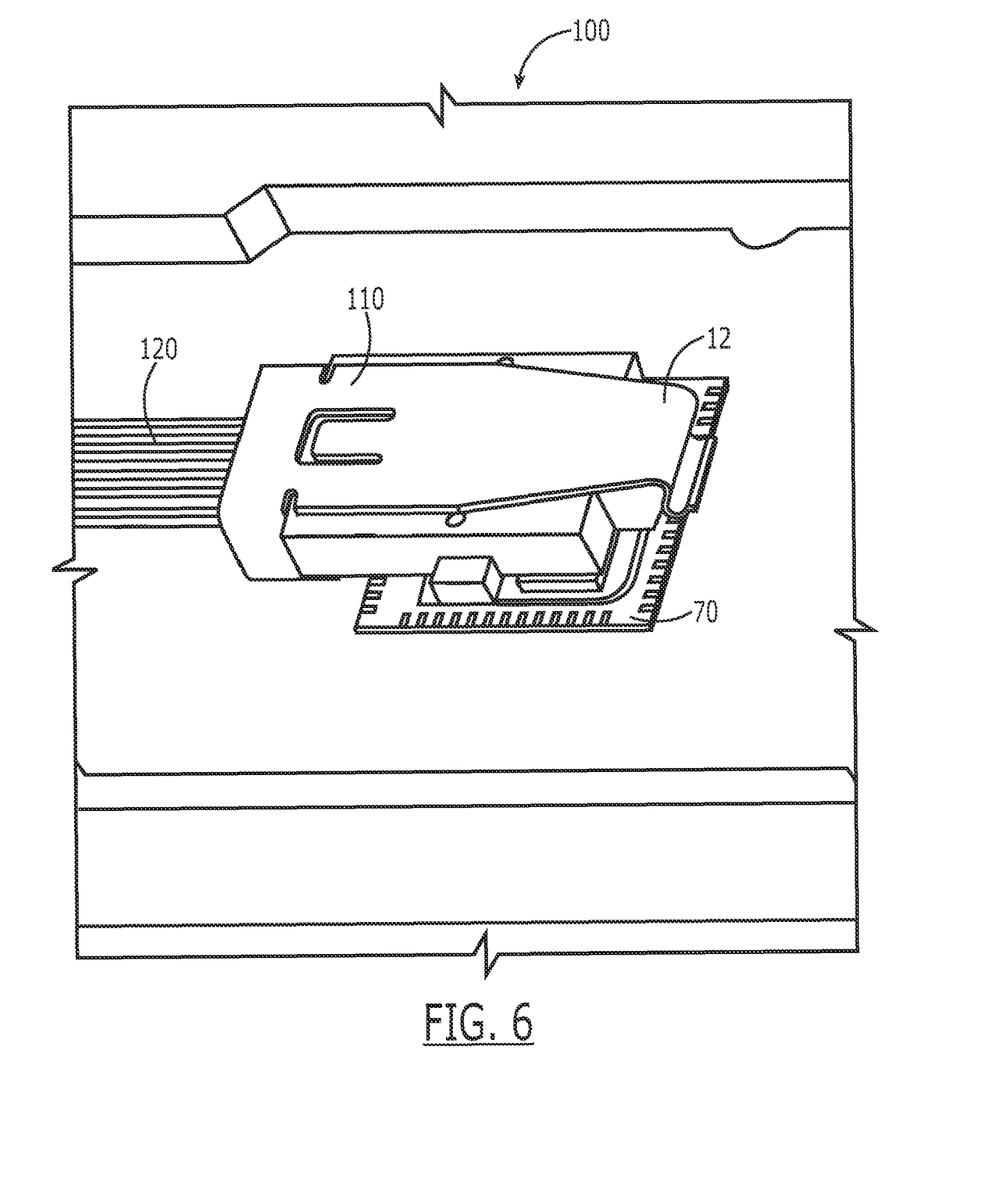
FIG. 6 is a perspective view of the lens body of FIGS. 2a-2g, shown mounted to an exemplary substrate in an optical subassembly.
Figure 7:
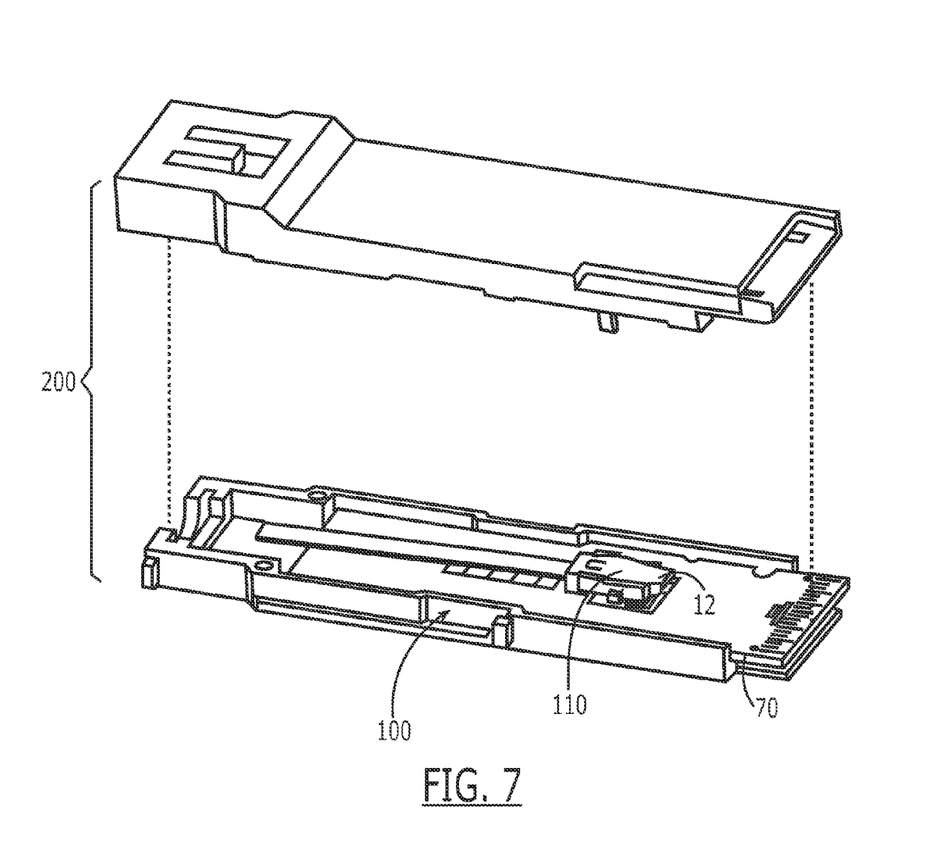
FIG. 7 is a perspective view of the lens body of FIGS. 2a-2g, shown partially assembled as part of an exemplary QSFP active cable lens assembly.

Accordingly, an optical subassembly 100 is provided that includes a substrate 70 having at least one perceptible alignment feature 74 and an lens body secured to the substrate, such that the lens body 10 and substrate 70 are secured in relative positions in which each alignment feature 74 of the substrate 70 appears to be centered, or otherwise aligned, within a respective viewing surface 42 of the lens body's alignment feature 40, as best shown in FIGS. 5 and 6. Further, the optical subassembly 100 may include a ferrule, such as a multi-fiber ferrule 110 or other connector interface, supporting at least one optical fiber 120, as best shown in FIGS. 3 and 6. FIG. 7 shows an optical subassembly 100 shown mounted to a conventional housing as part of an exemplary QSFP active cable assembly 200. It will be understood that the optical subassembly 100 may be assembled into any suitable cable assembly, such as a CXP active cable assembly, and into any corresponding transceiver module, using conventional assembly techniques that are beyond the scope of the present invention, and thus are not discussed in detail herein.

It should be understood that lens body 16 and the optical paths defined therein are merely representative of the invention, and not exhaustive.

The dedicated lens/alignment feature/alignment structure arrangement described above is described with reference to a lens body, for illustrative purposes. However, it will be appreciated that this arrangement is applicable in a broad range of applications for the purpose of alignment of juxtaposed structures. for example, the arrangement may be employed in any application in which two objects are to be aligned relative to one another. Further, the arrangement described can be used other than in optical applications. for example, a similar arrangement may be used to align surface mount components prior to solder reflow in printed circuit boards.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A lens body for focusing light from at least one light source supported on a substrate into a corresponding optical fiber, the lens body comprising:
   a body of an optically-clear moldable material comprising at least the following features:
      a port for supporting at least one optical fiber, said port comprising a contact surface positioned to interface with the optical fiber when the fiber is supported in the port;
      an active lens adapted to cooperate optically with a respective light source to focus light along a respective optical path between the light source and a corresponding optical fiber;
      at least one alignment structure defining a viewing surface; and
      at least one dedicated lens, positioned externally to any optical path between a light source and corresponding optical fiber, adapted to focus an image of an alignment feature on the substrate onto the viewing surface.

2. The lens body of claim 1, further comprising:
   at least one reflective surface disposed along one or more optical paths to alter the direction of said optical paths between each light source and its corresponding optical fiber.

3. The lens body of claim 1, wherein the active lens and the dedicated lens are configured to have substantially identical focal lengths.

4. The lens body of claim 3, wherein said viewing surface is positioned on said body such that the optical path length between said active lens and said contact surface is substantially identical to the optical path length between said dedicated lens and said viewing surface.

5. The lens body of claim 1, wherein said lens body comprises a plurality of active lenses.

6. The lens body of claim 5, wherein said body comprises at least a pair of dedicated lenses, and a corresponding plurality of alignment structures, each of said plurality of alignment structures having a respective viewing surface.

7. The lens body of claim 6, wherein said plurality of active lenses and said plurality of dedicated lenses are arranged in a single linear array.

8. The lens body of claim 7, wherein said all of plurality of active lenses are positioned between said pair of dedicated lenses within said single linear array.

9. The lens body of claim 1, wherein said alignment structure defines a void in said body adjacent a substantially-planar viewing surface.

10. The lens body of claim 9, wherein said void has a truncated conical shape.

11. The lens body of claim 1, wherein an optical path between each of said pair of dedicated lenses and each respective viewing surface is linear and does not pass through said reflective surface.

12. An optical subassembly comprising:
a substrate supporting a light source having optical axis, the substrate further comprising at least one perceptible alignment feature provided in a predetermined spatial relationship to the light source; and
a lens body, secured to said substrate, for focusing light from at least one light source supported on the substrate into a corresponding optical fiber, the lens body comprising:
a body of an optically-clear moldable material comprising:
a port for supporting at least one optical fiber, said port comprising a contact surface positioned to interface with the optical fiber when the fiber is supported in the port;
an active lens adapted to cooperate optically with a respective light source to focus light along a respective optical path between the light source and a corresponding optical fiber;
at least one alignment structure defining a viewing surface;
a dedicated lens, positioned externally to any optical path between a light source and a corresponding optical fiber, adapted to focus an image of the alignment feature on the substrate onto the viewing surface.

13. The optical subassembly of claim 12, further comprising:
at least one reflective surface disposed along one or more optical paths to alter the direction of said optical paths between each light source and its corresponding optical fiber;
wherein an optical path between each of said pair of dedicated lenses and each respective viewing surface is linear and does not pass through said reflective surface.

14. A method for preparing an optical subassembly, the method comprising:
providing a substrate supporting a light source having optical axis, the substrate further comprising at least one alignment feature provided in a predetermined spatial relationship to the light source;
providing a lens body for focusing light from at least one light source supported on the substrate into a corresponding optical fiber, the lens body comprising:
a body of an optically-clear moldable material comprising:
a port for supporting at least one optical fiber, said port comprising a contact surface positioned to interface with the optical fiber when the fiber is supported in the port;
an active lens adapted to cooperate optically with a respective light source to focus light along a respective optical path between the light source and a corresponding optical fiber;
at least one alignment structure defining a viewing surface;
a dedicated lens, positioned externally to any optical path between a light source and a corresponding optical fiber, adapted to focus an image of the alignment feature on the substrate onto the viewing surface;
positioning the lens body on the substrate so that the substrate's alignment feature is viewable on the viewing surface of the lens body's alignment structure;
moving the lens body relative to the substrate until the image of the substrate's alignment feature appears aligned relative to the viewing surface; and
securing the lens body to the substrate.

15. The method of claim 14, wherein moving the body relative to the substrate until the image of the substrate's alignment feature appears aligned relative to the viewing surface comprises visually centering the image of the alignment feature within a peripheral boundary of the viewing surface.

16. A body configured for alignment to a substrate comprising at least one perceptible alignment feature, said body comprising:
at least one alignment structure defining a viewing surface; and
a dedicated lens adapted to focus an image of the substrate's alignment feature through an optically-clear material of the body and onto the viewing surface.

17. An assembly comprising:
the body of claim 16; and
a substrate comprising at least one perceptible alignment feature, said body being secured to said substrate with said substrate's alignment feature aligned relative to the viewing surface of the body's alignment structure.

18. The assembly of claim 17, wherein said alignment feature is visually perceptible.

19. The assembly of claim 18, wherein said alignment feature is aligned relative to the viewing surface in that it appears centered within a boundary of the viewing surface.

* * * * *